Figure 1:
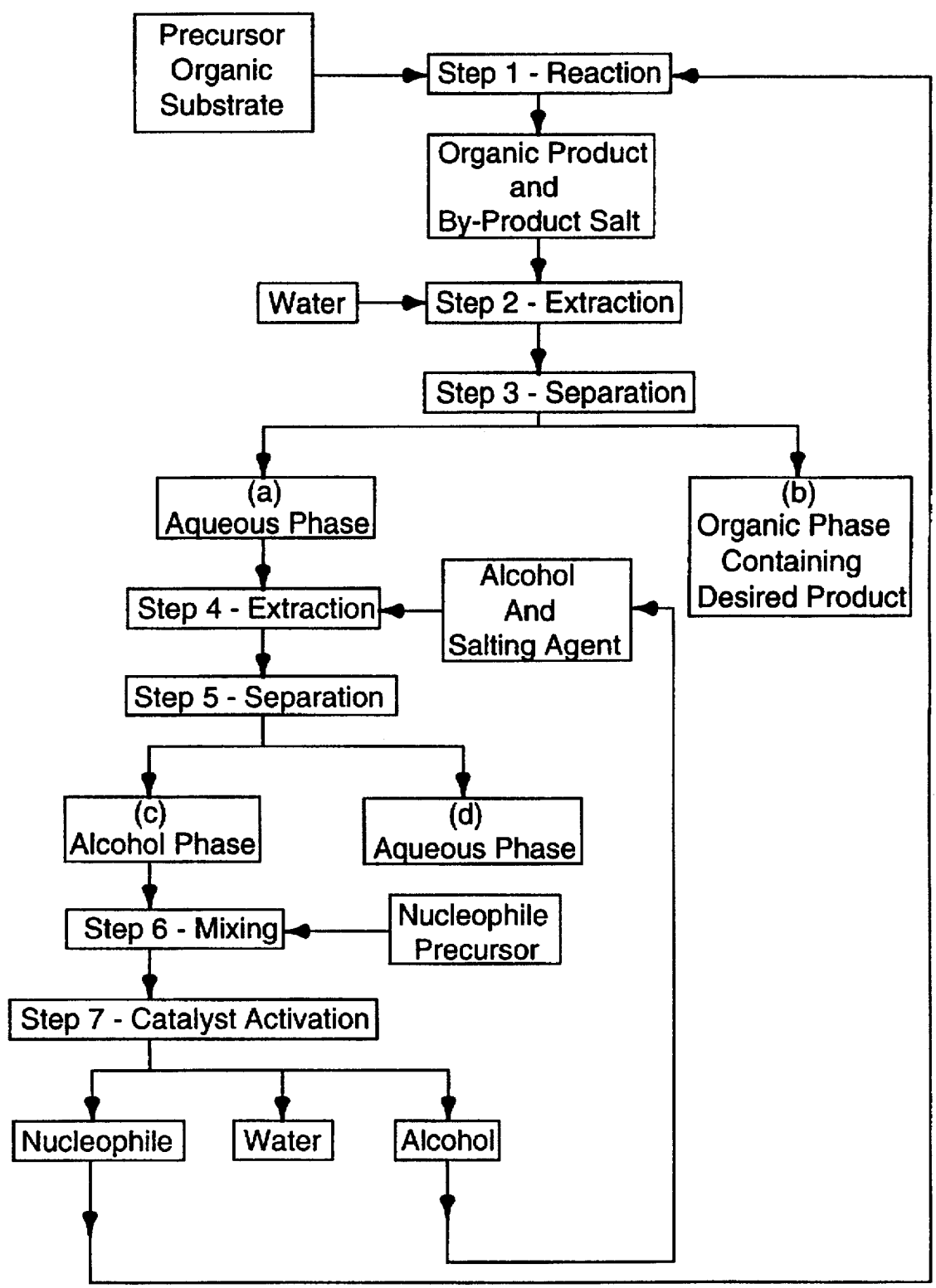

US005675029A

United States Patent [19]
Johnson

[11] Patent Number: 5,675,029
[45] Date of Patent: *Oct. 7, 1997

[54] CYCLIC PROCESS FOR ACTIVATION, USE AND RECOVERY OF PHASE-TRANSFER CATALYSTS

[75] Inventor: Kim L. Johnson, Cottage Grove, Minn.

[73] Assignee: Minnesota Mining and Manufacturing Company, St. Paul, Minn.

[*] Notice: The term of this patent shall not extend beyond the expiration date of Pat. No. 5,483,007.

[21] Appl. No.: 526,490

[22] Filed: Sep. 11, 1995

Related U.S. Application Data

[62] Division of Ser. No. 51,479, Apr. 22, 1993, Pat. No. 5,483,007.

[51] Int. Cl.$^6$ ............................ B01J 31/40; C08G 65/32
[52] U.S. Cl. ...................... 552/10; 525/403; 549/510; 552/11; 558/10; 558/11; 558/12; 558/344; 568/69; 570/170
[58] Field of Search ...................... 525/403; 549/510; 552/10, 11; 558/10, 11, 12, 344; 568/69; 570/170

[56] References Cited

U.S. PATENT DOCUMENTS

| | | | |
|---|---|---|---|
| 3,645,917 | 2/1972 | Vandenberg | 525/410 |
| 4,268,450 | 5/1981 | Frankel et al. | 552/11 |
| 4,379,894 | 4/1983 | Frankel et al. | 525/403 |
| 4,391,970 | 7/1983 | Okamato | 528/408 |
| 4,431,845 | 2/1984 | Young et al. | 568/606 |
| 4,486,351 | 12/1984 | Earl | 552/11 |
| 4,520,204 | 5/1985 | Evans | 548/461 |
| 4,879,419 | 11/1989 | Johannessen | 568/606 |
| 4,937,361 | 6/1990 | Wagner et al. | 552/11 |
| 5,055,600 | 10/1991 | Wagner | 552/11 |
| 5,238,889 | 8/1993 | Falling et al. | 502/24 |

FOREIGN PATENT DOCUMENTS

| | | |
|---|---|---|
| 0 456 455 A1 | 11/1991 | European Pat. Off. |
| 2 391 772 | 12/1978 | France |
| 51-006928 | 1/1976 | Japan |

OTHER PUBLICATIONS

Fourth Edition of the Kirk–Othmer Encyclopedia of Chemical Technology (1993), "Catalysis, Phase–Transfer", vol. 5, pp. 374–383.
Miller, R.S., Chemical Abstracts 108(4):24453z, 1988.
Frontier Orbitals and Chemical Reactions, by Ian Fleming, John Wiley and Sons (1976), Sec. 3.1.2, "Hard and Soft Nucleophiles and Electrophiles".
Frankel, Milton G. and Wilson, Edgar, R., Chemical Abstract 98(19):160570n, 1983.

*Primary Examiner*—Richard L. Raymond
*Attorney, Agent, or Firm*—Gary L. Griswold; Walter N. Kirn; Eloise J. Maki

[57] ABSTRACT

A process of making certain compounds using a phase transfer catalyst that permits the recovery and recycle of the phase transfer catalyst.

6 Claims, 2 Drawing Sheets

CYCLIC PROCESS FOR ACTIVATION, USE AND RECOVERY OF PHASE-TRANSFER CATALYSTS

This is a division of application Ser. No. 08/051,479 filed Apr. 22, 1993, now U.S. Pat. No. 5,483,007.

The United States Government has certain rights in this invention pursuant to Contract No. 33615-89-C-5713 awarded by the United States Air Force.

In one aspect, this invention relates to phase-transfer catalysis. In another aspect, it relates to a process for activation, use, and recovery of phase-transfer catalysts. In another aspect it relates to the use of such catalysts in the preparation of organic products, such as glycidyl azide polymers. In a further aspect it relates to a process for the use of such catalysts in the preparation of biologically active substances, such as organoazides and organothiocyanates.

Since the mid-1960s, phase-transfer catalysis has been developed on a laboratory scale. Commercialization of this technology, however, has languished for a number of reasons, including (1) the difficulties often encountered in removing the catalyst from the reaction product, and, (2) now due to environmental concerns, the increased costs of disposal (e.g., incineration) of wastewater containing levels of catalyst too low to be recovered economically but too high to be tolerated by industrial wastewater treatment facilities. Such facilities recently have been even further restricted by the U.S. Environmental Protection Agency from handling wastewaters containing low concentrations of any one of a number of common solvents. According to the Fourth Edition of the Kirk-Othmer Encyclopedia of Chemical Technology (1993), "Catalysis, Phase-Transfer," Vol. 5, pp. 374–383, "Undoubtedly cost factors and environmental considerations (recycling of solvents, less toxic or less hazardous materials) will lead to increasing industrial application of this methodology."

Phase-transfer catalysis, as defined by Kirk-Othmer, supra, and as used herein, "is a technique by which reactions between substances located in different phases are brought about or accelerated." Phase-transfer catalysis is especially useful for nucleophilic displacement reactions between chemically dissimilar substances, such as oleophilic organic substrates with good leaving groups, e.g., chloride and bromide groups, and ionic nucleophilic salts. (Without such catalysts, these reactions normally require the use of considerable quantities of polar, aprotic solvents, e.g., dimethylsulfoxide and dimethylformamide, as a homogeneous reaction medium.) Other advantages cited in Kirk-Othmer for using phase-transfer catalysts include "simpler work-up; shorter reaction time and/or lower reaction temperature."

Phase-transfer catalysis often employs solid nucleophile (or aqueous solution of the nucleophile) in contact with organic substrate (or organic substrate in solution in organic water-insoluble solvent or diluent) in the presence of phase-transfer catalyst which can carry activated nucleophile into the organic phase (viz., the organic substrate or solution thereof) to accomplish the reaction and then move back to the aqueous phase to pick up more nucleophilic anion. Some phase-transfer catalysts are quaternary ammonium and quaternary phosphonium salts. If the phase-transfer catalyst is liquid and the substrate is suitably miscible with the catalyst, the reaction can be run without the need for solvents or diluents.

According to the Kirk-Othmer article (p. 374), a mechanistic picture (depicted below) was developed by C. M. Starks to show phase-transfer catalysis between liquid polar and aqueous phases; the same mechanism can be used to describe phase-transfer catalysis between liquid, nonpolar, organic phase and solid salt phase.

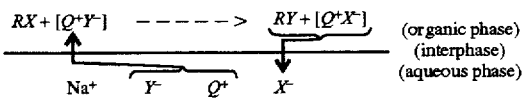

Again, according to Kirk-Othmer (p. 374), "The catalyst cation $Q^+$ extracts the more lipophilic anion $Y^-$ from the aqueous to the nonpolar organic phase where it is present in the form of a poorly solvated ion pair $[Q^+Y^-]$. This then reacts rapidly with RX, and the newly formed ion pair $[Q^+X^-]$ returns to the aqueous phase so that anions are exchanged at the phase boundary."

Glycidyl azide polymer is a nucleophilic displacement product useful for a binder in "environmentally-friendly" propellant formulations because the polymer allows for replacement of ammonium perchlorate (whose chlorine-containing combustion products contribute to ozone depletion) by ammonium nitrate without excessive loss of thrust. Such polymer is typically made by displacing the chlorine atoms from polyepichlorohydrin or substrate reactant with azide ions of a metal azide nucleophile precursor, usually sodium azide. Since both reactants have widely differing polarities, this conversion has been accomplished by employing both dipolar [sic] aprotic solvents and phase-transfer catalysts. For example, see U.S. Pat. No. 4,268,450 (Frankel et al.), U.S. Pat. No. 4,379,894 (Frankel et al.), U.S. Pat. No. 4,937,361 (Wagner et al.), U.S. Pat. No. 5,055,600 (Wagner), U.S. Pat. No. 4,520,204 (Evans), U.S. Pat. No. 4,486,351 (Earl), U.S. Pat. No. 3,645,917 (Vandenberg) and U.S. Pat. No. 4,879,419 (Johannessen).

U.S. Pat. No. 4,268,450 describes the synthesis of glycidyl azide polymer by reacting polyepichlorohydrin with sodium azide. In the example described in this patent, the synthesis was done in dimethylformamide solvent. The resulting reaction mixture was cooled and diluted with methylene chloride, was washed with water to remove sodium azide and dimethylformamide, and was dried over magnesium sulfate and concentrated to give 72.9% yield.

U.S. Pat. No. 4,379,894 describes an aqueous process for the quantitative conversion of polyepichlorohydrin to glycidyl azide polymer using a phase-transfer catalyst. The patent describes the problems associated with the use of the dipolar solvents, such as dimethylformamide and dimethylsulfoxide, which include long work-up times, and the difficulty in removing these expensive solvents from the glycidyl azide product, causing loss of product. The described process comprises reacting polyepichlorohydrin and sodium azide in a mixture of water and a catalyst (preferably methyltrihexylammonium chloride as the phase-transfer catalyst) while agitating and heating at 90°–95° C. for 48 hours. The glycidyl azide product is purified by washing with hot water to remove inorganic salts (unreacted sodium azide and by-product sodium chloride), then washing with alcohol (preferably isopropyl alcohol) to remove the phase-transfer catalyst, followed by dissolving the washed glycidyl azide polymer in a non-polar solvent (preferably methylene chloride), passing the resulting nonpolar solvent solution through adsorbents (preferably silica gel) to remove impurities, and finally concentrating and isolating the product by vacuum distillation of the non-polar solvent.

U.S. Pat. No. 4,937,361 describes a method of producing glycidyl azide polymer by the reaction of sodium azide with polyepichlorohydrin in dimethylsulfoxide solvent (or other polar solvent) at 100° C., utilizing a catalyst such as methyltrioctylammonium chloride or lithium chloride. It is stated that "these catalytic agents undergo metathesis with sodium azide to produce an azide which is more soluble than $NaN_3$ in the dimethylsulfoxide reaction mixture. The consequence of the higher concentration of azide ion so produced is to increase the reaction rate."

U.S. Pat. No. 5,055,600 describes a solvent-free, molten-salt method for the synthesis of glycidyl azide polymer from polyepichlorohydrin and a quaternary ammonium azide. It is stated that the reaction rate, especially in the later stages of the reaction, is faster in this solvent-free method compared to the art (which uses inorganic azides such as sodium azide) because a higher concentration of azide ions is available for displacement of the chlorine atoms in polyepichlorohydrin. The quaternary ammonium azide salts specified have a rather narrow melting-point range of about 80° C. to about 120° C. In Example 4, 29.3 g (0.298 eq) of polyepichlorohydrin was added to a molten, stirred, mass of tetrabutylammonium azide (93.2 g, 0.327 mole, m.p. 85° C.). After 35 minutes, the temperature was raised to 105° C. After 3 hours, the reaction product was washed twice with water and vacuum dried to give a 98% yield of glycidyl azide polymer product.

The preparation of other azido compounds by nucleophilic displacement reactions with ionic azides in the presence of quaternary ammonium phase-transfer catalysts has been disclosed. Chemical Abstracts (Vol. 98, p. 160570n, Frankel et al.) describes the preparation of 3,3-bis (azidomethyl)oxetane in 84.7% yield and 98% purity by the reaction of the corresponding bis-chloromethyl compound and sodium azide in water in the presence of methyltrihexylammonium chloride. Further purification to 99% was achieved by passing a methylene chloride solution of the product over basic alumina.

Other nucleophilic displacement products, such as thiocyanates, have also been prepared using phase-transfer catalysts, such as quaternary ammonium salts. Japanese unexamined patent application (Kokai) 51006928 (Nippon Soda Co., Ltd.) describes the reaction in water of methylene dibromide with sodium thiocyanate in the presence of tetrabutylammonium chloride to yield methylene dithiocyanate.

In U.S. Pat. No. 4,520,204, a method for the production of aromatic etherimides is described using tetraalkylammonium halide phase-transfer catalysts, where o-dichlorobenzene is used to extract the phase-transfer catalyst from the water used to wash the product; later, under one option of the method, this catalyst is recycled. One to two volumes of o-dichlorobenzene was used per volume of aqueous phase, and the o-dichlorobenzene was recovered by vacuum evaporation. Percent recovery of catalyst from wash solution was as low as 5% but could be increased to as high as 80% by adding sodium nitrite and heating to 67° C.

Figure 2:
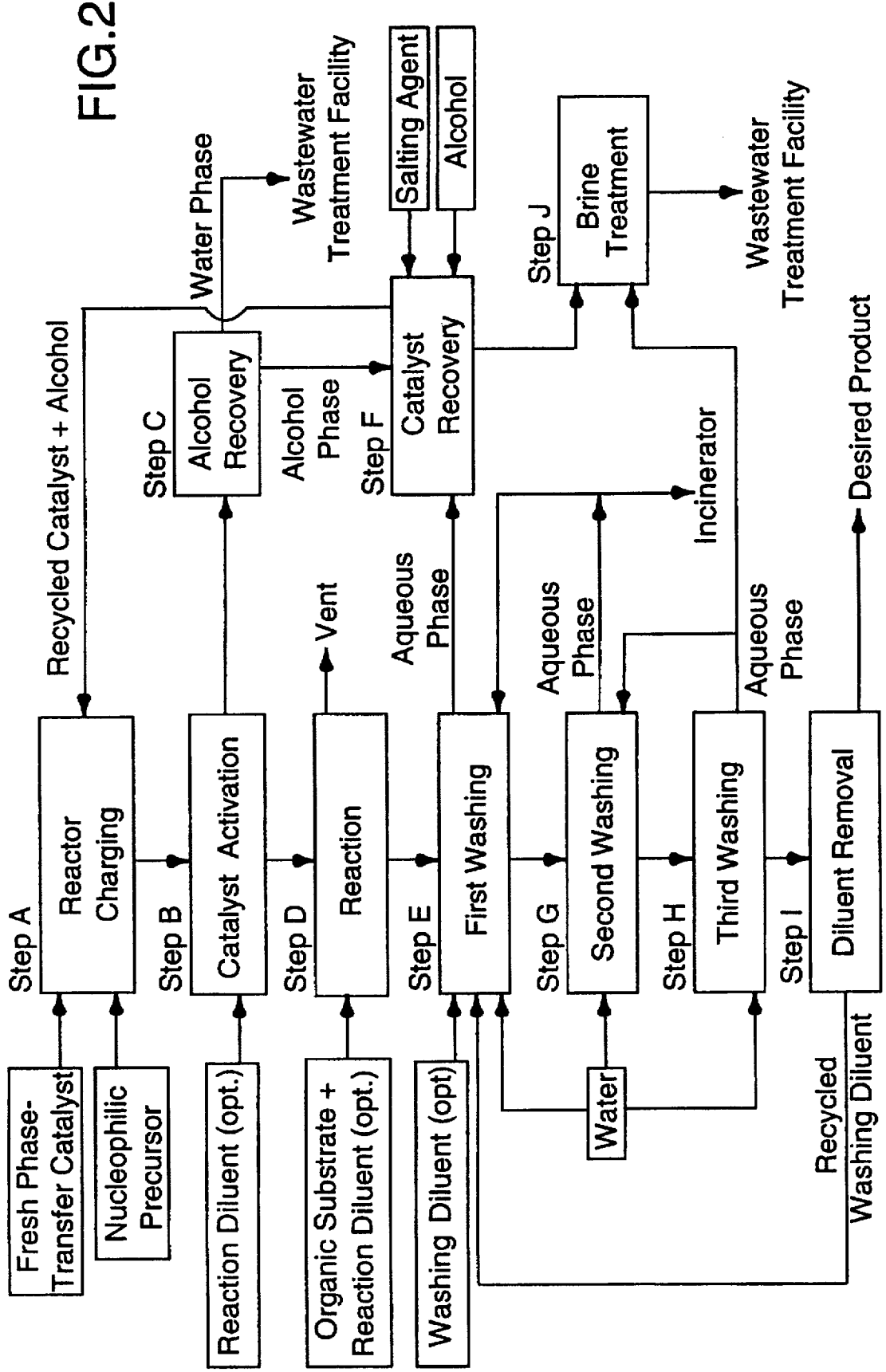

In the accompanying drawing, FIGS. 1 and 2 are schematic flow diagrams illustrating aspects of this invention.

Briefly, in one aspect, this invention provides a cyclic process comprising making an organic product by phase-transfer catalysis, purifying said product, and recycling the phase-transfer catalyst. This process, FIG. 1 illustrating a cycle thereof, and more readily understood as a batch process, comprises the steps of:

(1) reacting in a reaction zone, in a liquid organic phase (and with no water added thereto), a precursor organic substrate (containing one or more leaving groups), such as polyepichlorohydrin, with a nucleophile derived by metathesis of a select, water-soluble, thermally stable, cationic phase-transfer catalyst, such as methyltributylammonium chloride, with an amount of nucleophilic precursor (or "co-reactant"), such as sodium azide, in excess of the stoichiometric amount required to displace the leaving groups of the precursor organic substrate in the reaction zone, to yield the desired organic product, such as glycidyl azide polymer, fresh precursor organic substrate being added to the reaction zone in each process cycle;

(2) extracting or washing in one, a few, or several steps the catalyst, together with or in admixture with its metathesized form, from the resulting reactor product with extracting agent comprising water, thereby forming (a) an aqueous phase comprising said phase-transfer catalyst, its metathesized form, and by-product salt, e.g., NaCl, and (b) an organic phase comprising the desired organic product, such as glycidyl azide polymer;

(3) separating the two phases (a) and (b) of step (2) to recover the desired organic product;

(4) extracting the separated aqueous phase (a) with a partially water-miscible alcohol, such as isobutyl alcohol, and salting agent, such as sodium chloride, thereby forming (c) an alcohol phase comprising the phase-transfer catalyst and water and (d) an aqueous phase comprising said by-product salt and salting agent;

(5) separating the two phases (c) and (d) of step (4);

(6) mixing the resulting separated alcohol phase (c) with a replenishing amount of said nucleophilic precursor to metathesize said catalyst in said alcohol phase;

(7) activating the resulting metathesized catalyst by separating water and alcohol from the mixture of step (6) to form the active nucleophile used in the reaction of step (1);

(8) recycling the removed nucleophile to step (1);

(9) recycling the removed alcohol to step (4); and repeating the cycle of the foregoing steps (1) to (9) to make a desired amount of said organic product.

The select phase-transfer catalyst to be used is a quaternary ammonium or pyridinium salt which is soluble in said alcohol to a degree greater than its solubility in water containing said salting agent, that is, the major amount of the phase-transfer catalyst in step (4) partitions into said alcohol phase (c) rather than into said aqueous phase (d).

In initiating the above-described process, i.e., in preparation for the first cycle thereof, fresh phase-transfer catalyst (generally in the form of an aqueous solution), a fresh supply of the alcohol, and a fresh supply of nucleophilic precursor are mixed. The nucleophilic precursor and phase-transfer catalyst are metathesized (as in step (6)) and the resulting metathesized catalyst is activated (as in step (7)) to begin the process at step (1).

In carrying the above-described process, various organic solvents or diluents can be used to facilitate various operations or steps, for example, they can be used in carrying out the reaction of step (1), extraction step (2), and mixing step (6), as will be described in detail hereafter. And the desired organic product can be recovered from said separated organic phase (b) by evaporation of any diluent from said phase, or by cooling said organic phase to form a concentrated product phase, or by crystallization of the organic product from said organic phase.

The above-described process can be used for the preparation of various nucleophilic displacement organic substances, such as azide, thiocyanate, cyanide, sulfide, methoxide, and phenoxide polymers and compounds, by reaction of water-insoluble, organic precursors (or reactor substrates), possessing leaving groups, selected from carbon-bound chloro-, bromo-, nitro-, nitrato-, and organosulfonyloxy-containing substances with nucleophiles, such as that derived from azides, thiocyanates, cyanides, methoxides, and phenoxides, which are among those listed in Kirk-Othmer, supra (p. 375), in the presence of the select phase-transfer catalyst which catalyzes the reaction.

This invention provides a fast process that produces a high purity product in high yield. The process is economical, typical recoveries of catalyst, alcohol, and diluents exceeding 90%. The catalyst is readily removed from the desired reaction product and recycled with minimal losses. Wastewater that is produced typically will contain such low amounts of catalyst, alcohol, and diluents that economical disposal means, such as industrial wastewater treatment facilities, can be used.

A class of the water-insoluble substances useful as organic precursors, substrates or reactants can be represented by the following general formula:

$$R(X)_a \quad (I)$$

where:

R is a mono- or polyvalent organic group of valence "a", containing, for example, 1 to 720 carbon atoms, such as an aliphatic or aromatic radical or combination of such radicals which can contain or be substituted with moieties (such as heteroatoms) that are unreactive with the nucleophile or the desired product and do not adversely affect the desired product, such as oxy, tertiary nitrogen, carbonyl, or combinations of such moieties, e.g. —C(O)O—;

each X is the same or different leaving group selected from Cl, Br, $NO_2$, $NO_3$, and $OSO_2R'$, where R' is an organic group selected from alkyl, aryl, fluoro-substituted alkyl groups, and combinations thereof, R' preferably being —$C_6H_5$, —$CH_3$ or —$CF_3$; and subscript a is the valence of R and is 1 to 60 or more.

A subclass of formula (I) is a polyepichlorohydrin polymer represented by the general formula:

$$R[(OCH_2CH)_xOH]_y \quad (II)$$
$$| \quad CH_2Cl$$

where:

R is an organic group having a valence "y" and can be a hydroxy-free residue of a mono-, di-, tri- or polyhydroxy compound which is unsubstituted or substituted, e.g., with chlorine, and having, for example, 2 to 20 carbon atoms, such as the hydroxy-free residue of ethylene or propylene glycols, trimethylolpropane, or 3-chloro-1,2-dihydroxypropane;

x is about 10 to about 60; and y is 1 to about 4.

A class of nucleophilic displacement products prepared by the method of this invention can be represented by the following general formula $$R(Y)_a \quad (III)$$

where:

R and subscript a are as defined in general formula (I); and Y is a nucleophile-derived group that is preferably selected from $N_3$, SCN, CN, SH, $NO_2$, $NO_3$, $OCH_3$, and $OC_6H_5$.

A subclass of general formula (III) has the formula

$$R[(OCH_2CH)_xOH]_y \quad (IV)$$
$$| \quad CH_2N_3$$

where:

R, x, and y are as defined for formula (II).

Representative organo- chloro-, bromo-, nitro-, nitrato-, and organosulfonyloxy-substituted substances useful as organic substrates or precursors or reactants in the process of this invention are shown in the left column of the table below, with corresponding nucleophilic displacement reaction products shown in the right column.

| Precursors | Corresponding Products |
|---|---|
| HO[CH(CH$_2$Cl)CH$_2$O]$_m$C$_2$H$_4$— —[OCH$_2$CH(CH$_2$Cl)]$_n$OH | HO[CH(CH$_2$N$_3$)CH$_2$O]$_m$C$_2$H$_4$— —[OCH$_2$CH(CH$_2$N$_3$)]$_n$OH |
| Cl(CH$_2$)$_6$Cl | N$_3$(CH$_2$)$_6$N$_3$ |
| CH$_2$(Br)$_2$ | CH$_2$(SCN)$_2$ |
| C$_4$H$_9$OC(O)CH$_2$Cl | C$_4$H$_9$OC(O)CH$_2$N$_3$ |
| C$_4$H$_9$OC(O)CH$_2$Cl | C$_4$H$_9$OC(O)CH$_2$OCH$_3$ |
| C$_4$H$_9$C(C$_2$H$_5$)CH$_2$OSO$_2$CH$_3$ | C$_4$H$_9$C(C$_2$H$_5$)CH$_2$SCN |
| C$_4$H$_9$OC$_2$H$_4$OC$_2$H$_4$Cl | C$_4$H$_9$OC$_2$H$_4$OC$_2$H$_4$SCN |
| C$_{12}$H$_{25}$OC(O)CH$_2$Cl | C$_{12}$H$_{25}$OC(O)CH$_2$SCN |
| C$_6$H$_{13}$Cl | C$_6$H$_{13}$CN |
| C$_6$H$_{13}$Cl | C$_6$H$_{13}$F |
| C$_8$H$_{17}$Cl | C$_8$H$_{17}$SH |

Typically, the particular precursor organic substrate used in the invention will be selected based upon the the properties desired in the final displacement product. For example, a polyepichlorohydrin polymer may be selected to provide the hydroxyl functionality and molecular weight desired in the corresponding glycidyl azide polymer for use, for example, in an energetic binder composition for solid propellants. Similarly, a glycol ether can be selected and converted to a halide and then, using the process of this invention, to a thiocyanate with insecticidal properties.

In the aspect of making glycidyl azide polymer, the precursor organic substrates useful in this invention comprise those polyepichlorohydrin polymers known in the art and have chlorine atoms, which are good leaving groups. The polyepichlorohydrin polymer can be prepared by the polymerization of epichlorohydrin monomer using methods known in the art. Examples of such useful polyepichlorohydrin polymer are described, for example, in U.S. Pat. No. 4,431,845 (Young et al), U.S. Pat. No. 4,391,970 (Okamato) and U.S. Pat. No. 4,879,419 (Johannessen).

The process of this invention can also be used to make monomeric as well as polymeric nucleophilic displacement products. A good example of a monomer used in the manufacture of energetic polymers is 3,3-bis(azidomethyl) oxetane. This compound is homopolymerized or co-polymerized with co-monomers to form various polymers useful in making binders for energetic compositions such as solid propellants and explosives.

The process of this invention can also be used to make 1,6-diazidohexane from either 1,6-dibromohexane or 1,6-dichlorohexane. This azido material has been suggested by R. S. Miller, Chemical Abstracts 108(4):24453z, as an additive for liquid ramjet fuels to improve the ignitability of the droplets and therefore the combustion efficiency.

Phase-transfer catalysts useful in the process of this invention, whether quaternary ammonium or pyridinium salts, generally have the following properties and features:

1. Adequate thermally stability. At drying and reaction conditions, e.g. 80°–120° C., in the presence of the nucleophile, alcohol, organic substrate, displacement product, and diluent, generally, no more than 5% and preferably no more than 1% of the phase-transfer catalyst degrades or decomposes during the metathesis, activation, and displacement steps.

2. Melting point <60° C. When paired with the nucleophile, the phase-transfer catalyst has a melting point lower than drying and reaction temperatures, and the catalyst typically has at least 9 carbon atoms per nitrogen atom.

3. Appreciable solvency. The phase-transfer catalyst has appreciable solubility in the organic substrate and/or diluent (greater than 20%), and there is also solubility of organic substrate (greater than 20%) and nucleophilic precursor (greater than 0.5%) in catalyst in order for it to be most effective.

4. Sufficient steric hindrance. The phase-transfer catalyst, if it is a quaternary ammonium salt, may have a maximum of only one methyl group per nitrogen atom. The pyridinium catalysts may have one or more methyl groups provided there is no methyl group on the ring nitrogen atom.

5. Strong hydrophilicity. For easy removal by washing with water at 0°–70° C., the phase-transfer catalyst-nucleophile pair, [$Q^+Y^-$], has a n-octanol/water partition coefficient of less than about 0.1. For polar or "hard" nucleophiles, such as azide, cyanide, and the like, the catalyst has less than 16 carbon atoms, and preferably 12 to 14 carbon atoms, per nitrogen atom. For more lipophilic or "soft" nucleophiles, such as thiocyanate, sulfide, phenoxide, and the like, the catalyst has less than 14 carbon atoms and preferably 10 to 12 carbon atoms per nitrogen atom.

6. Sufficient lipophilicity. The phase-transfer catalyst-nucleophile pair possesses enough organic character to be extractable from an aqueous brine phase into a C4 to C6 alcohol-based phase at 50°–90° C. with at least an 80% recovery of catalyst. For use of "hard" nucleophiles, the cationic portion of the catalyst, $Q^+$, has at least 12 carbon atoms, e.g., 12 to 15, per nitrogen atom, whereas for use of "soft" nucleophiles, $Q^+$ has only 10 or more carbon atoms, e.g., 10 to 13, per nitrogen atom (see Frontier Orbitals and Chemical Reactions, by Ian Fleming, John Wiley and Sons (1976), Sec. 3.1.2, "Hard and Soft Nucleophiles and Electrophiles").

Preferably, the quaternary ammonium and pyridinium compounds are either low-melting or non-crystalline and thus the nucleophilic salt can be dispersed in it. For efficient handling, the quaternary ammonium or pyridium phase-transfer catalyst can be a liquid at ambient temperature or melt at a temperature of less than about 60° C.

The quaternary ammonium and pyridinium compounds also have good stability under the reaction conditions, that is, they will not readily decompose or form undesirable products during metathesis, activation, and the heated reaction between the substrate and the nucleophile. Preferably, less than 5%, and more preferably less than 1%, of the initial amount of the quaternary ammonium or pyridinium compound added at Step A will decompose or degrade by the end of the reaction. This catalyst stability property permits a large portion of the quaternary ammonium or pyridinium compound used in the reaction to be recycled. (Some known quaternary ammonium compounds are not as stable as the compounds used in the process of this invention, and would form significant amounts of undesirable products, e.g., tertiary amines, due to their decomposition or degradation during the displacement reaction, resulting in reduced recyclability and greater difficulty in purifying the final product.)

The quaternary ammonium or pyridinium compounds can be removed from the reaction product, which is generally dissolved in a low polarity organic diluent, by washing at least twice with water. The recycled alcohol, along with an inexpensive salt such as sodium chloride, can then be added to the wash water, preferably from the first water washing, which results in the formation of two phases, with nearly all of the phase-transfer catalyst partitioning preferentially to the alcohol-rich top phase. Additionally, phase-transfer catalysts having more than 15 carbon atoms per nitrogen atom would be difficult to remove from the reaction product.

The amount of the phase-transfer catalyst (total of recycled and make-up catalyst) used to prepare the mixture of Step B is an effective amount to promote the reaction between the organic substrate or reactant and nucleophile and result in a faster reaction rate and/or a greater degree of reaction completion than would occur in the absence of the phase-transfer catalyst. Generally, 10 to 120 parts of catalyst per 100 parts of organic substrate or reactant is a useful range of ratios for this invention.

A class of the select phase-transfer catalysts used in this invention are guaternary ammonium salts and pyridinium salts, respectively by the following formulas:

 (V)

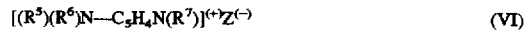 (VI)

wherein $R^1$, $R^2$, $R^3$, $R^4$, $R^5$, $R^6$, and $R^7$, which can be the same or different, are independently selected from $C_1$ to $C_{10}$ organic radicals or groups, preferably $C_1$ to $C_6$ organic groups, which are selected from aliphatic linear, branched, or cyclic groups, or combinations thereof and which can contain one or more, e.g., 1 to 10 heteroatoms, such as O and N atoms, bonded only to carbon atoms, providing that there is a linkage with at least three carbon atoms, e.g., an alkylene group such as propylene and butylene, between the depicted quaternary or pyridinium nitrogen atom, $N^+$, and any adjacent heteroatom, except that such a linkage in $R^5$ and $R^6$ can be two carbon atoms as well, i.e., ethylene, and no branching on any carbon atoms directly attached to said $N^+$, and where any of the two $R^1$, $R^2$, $R^3$ and $R^4$ groups in formula (V) or the $R^5$ and $R^6$ groups in formula (VI) can, with the N atom to which they are bonded, form a heterocyclic ring containing 3 to 7 atoms; and $Z^-$ is an anion selected from halide (e.g., chloride), azide, thiocyanate, sulfate, hydrogen sulfate, alkylsulfate (e.g., ethosulfate), alkoxide (e.g., methoxide), and aryloxy (e.g., phenoxy). Preferred phase-transfer catalysts are:

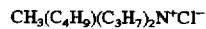

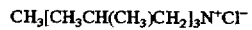

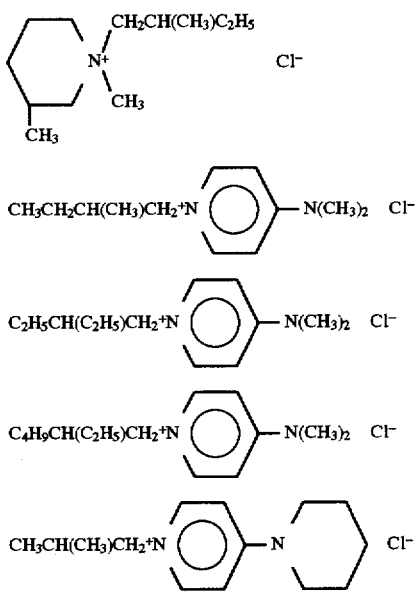

Partially water-miscible alcohols, e.g., $C_4H_9OH$, $C_5H_{11}OH$, $C_6H_{13}OH$, or $c$-$C_6H_{11}OH$, are essential for the activation, alcohol recovery, and reaction steps (Steps B, C, and D) to work satisfactorily. These alcohols, preferably having 4 to 6 carbon atoms, are also necessary for extracting the phase-transfer catalyst from the first aqueous wash phase for recycling into reaction steps in subsequent cycles. Relatively acidic, completely water-miscible alcohols, such as 2-ethoxyethanol and (2-methoxy)ethoxyethanol, were found to give slower reaction rates in Steps D and darker-colored displacement product than the preferred alcohols. When non-protic, nonpolar solvents, such as toluene, o-xylene, and Fluorinert™ FC-77 fluorocarbon fluid, were tested as azeotropic drying agents for aqueous methyltributylammonium chloride-sodium azide slurries, excessive phase-transfer catalyst decomposition was noted even under reduced-pressure drying conditions.

An embodiment of this invention is a cyclic process (a cycle thereof being illustrated in FIG. 2 and within the scope of the described FIG. 1) comprising the following steps:

(A) Initially preparing or providing a reactant charge mixture comprising four components:

(1) nucleophilic precursor;

(2) a catalytically effective amount, e.g., 10 to 150 parts per 100 parts organic substrate reactant, of phase-transfer catalyst, which is selected from the group consisting of the quaternary ammonium or pyridinium compounds or mixtures of compounds, represented by said formula (V) and (VI), can be used in the form of an aqueous solution or an alcoholic solution, the latter solution preferably being obtained by recycling the used phase-transfer catalyst from a previous cycle and any fresh catalyst as needed to make up the requisite quantity;

(3) a partially water-miscible alcohol containing 4 to 6 carbon atoms, e.g., an alkanol, such as isobutyl alcohol, or a cycloalkanol, such as cyclohexanol, optionally containing dissolved water, recycled from a previous cycle, and/or fresh as needed to make up the requisite quantity for effective dehydration of the reactant mixture in Step B; and (4) optionally, as needed to impart desired fluidity or to aid in handling of the reactant mixture, an organic diluent, e.g., dioxolane, which may be a solvent for the organic reactant added in Step D;

(B) activating the resulting metathesized catalyst by removing the water and alcohol from the resultant reactant mixture of Step A by azeotropic distillation at reduced pressure, and optionally adding further organic diluent for fluidity or handling;

(C) separating from the resulting azeotropic distillate the water-rich phase from the alcohol-rich phase and saving the latter phase for re-use in Step F;

(D) reacting in a reaction zone the non-volatile dehydrated portion of the reactant mixture or residue prepared in Step B with the organic reactant (or precursor substrate) to produce the corresponding nucleophilic displacement reaction product, while removing, for example, by venting from the reaction zone or sparging or vacuum distillation, residual alcohol and any diluent from the resulting reaction mixture;

(E) washing the reaction mixture with water, after optionally adding non-reactive, water-immiscible organic diluent to the reaction mixture of Step D, thereby forming an aqueous phase comprising said catalyst, in metathesized form, and by-product salt, and an organic phase comprising said organic product;

(F) recovering the phase-transfer catalyst from the aqueous phase from Step E by adding enough sodium chloride or other salting agent, and enough of the partially water-miscible alcohol, most of which is preferably in the alcohol-rich phase recycled in Step C, to form or "salt out" a catalyst-rich alcohol phase, and decanting or otherwise separating the brine from the catalyst-containing alcohol phase, which also may contain reusable, excess nucleophile;

(G) washing the organic phase from Step E with water and, optionally, recycling the resulting separated aqueous phase to Step E of the next cycle, or discarding the separated aqueous phase;

(H) optionally washing the organic phase from Step G with water or a water-methanol solution and recycling the aqueous phase to Step G, or discarding the separated aqueous phase;

(I) recovering the resulting washed product from the washed organic phase by crystallization, cooling and phase separation, solvent evaporation, or other methods of recovery, and saving any diluent produced in this recovery step for re-use in Step E of the next cycle;

(J) optionally, diluting the brine from F, if necessary for fluidity or handling, and treating the diluted brine solution with an appropriate chemical neutralizing agent so it can be treated by a waste water facility; and repeating the cycle of the foregoing steps A to J to make a desired amount of said organic product.

(In another aspect of this invention, a process for making an organic product by phase-transfer catalysis is provided which is like the foregoing process illustrated in FIG. 2 except that Steps C, F and J are omitted.)

In order to reduce the viscosity, melting point, or other property (such as detonability) of the activated catalyst and/or the organic substrate, and thus improve their handling characteristics, they can optionally be mixed or blended with an effective amount of a unreactive diluent (or solvent) hereafter referred to as the reaction diluent. The reaction diluent used to reduce the viscosity of the mixture prepared in Step B does not have to be the same as that used to improve substrate handling in Step D, and can be a low-viscosity precursor substrate or the diluent of Step E added during Steps A or B.

The amount of the reaction diluent to be used will depend upon the physical properties of the particular system. However, the amount of reaction diluent is generally at least sufficient to achieve the desired handling characteristics because excessive diluent could retard reaction rates and often must be removed from the reaction product. While amounts of reaction diluent up to 100 weight percent of the organic substrate or phase-transfer catalyst may be used, lesser amounts of 5 to 40 weight percent are more typically used. The amount of diluent added to the mixture prepared in Step A or B should be sufficient to maintain easy handling of the mixture during Steps B and D.

Useful reaction diluents include aprotic organic liquids in which the catalyst, organic substrate and resulting reaction product are all soluble. The reaction diluent should also be unreactive with the nucleophile, phase-transfer catalyst, organic substrate and the reaction product. Preferably, the diluent should also be relatively easy to remove from the reaction product by known methods, such as vacuum evaporation.

Representative examples of useful reaction diluents are tetrahydrofuran, 1,3-dioxolane, 1,4-dioxane, $CH_3OC_2H_4OCH_3$, isobutyl isobutyrate and ethyl pivalate.

In order to reduce the polarity, viscosity, melting point and/or hazardous nature of the reaction product for the washing steps (Steps E, G and H), the reaction product may be mixed with an effective amount of organic diluent (or solvent), hereafter referred to as the washing diluent. The washing diluent may be added to improve water-washing effectiveness in removing phase-transfer catalysts and other salts from the reactor product.

The washing diluent is preferably one that is essentially unreactive with nucleophile, catalyst, organic substrate, organic reaction product, water, and all other process solvents; is immiscible with water; and has a maximum boiling point of about 200° C. for easy removal. Preferred washing diluents include:

(1) perchloroethylene containing about 20–60 wt %, preferably about 25–30 wt %, of esters with a total of 8 or more carbon atoms, such as butyl butyrate, pentyl propionate, and isobutyl isobutyrate; and (2) neoacid esters with a total of 6 or more carbon atoms, such as methyl, ethyl and butyl pivalate; and propyl neoheptanoate. If used, washing diluent is recyclable from process Step I.

The reaction product can be recovered from the catalyst-free washing diluent by, for example, (a) vacuum evaporation under reduced pressure (e.g., 5 to 60 torr) at 40° to 125° C., or (b) cooling to reduce the solubility of the product in the diluent, followed by liquid-liquid phase separation, or (c) crystallization, depending on product properties. The phase-transfer catalyst can be recovered from the aqueous wash liquid from Step E by extraction with alcohol after addition of salt to the aqueous phase (Step F).

The nucleophilic precursor salts useful in this invention are preferably selected from the alkali metal and alkaline earth metal azide, sulfide, thiocyanate, cyanide, alkoxide, aryloxide, nitrite, nitrate, fluoride salts and the like. Preferably, a sodium salt of the desired nucleophile is used, and preferably it is used in granulated form to permit better dispersion of the salt in the mixture prepared in Step A. Generally, the nucleophilic salt is used in an excess of about 5 to 35 percent above the stoichiometric amount (or equivalent ratio) with the substrate. Preferably, the excess is from 10–25 percent (1.10 to 1.25 equivalents per equivalent of organic substrate), about one-half of the excess being recycled into the next cycle via Step F.

Water and $C_4$ to $C_6$ alcohols (the alcohols being useful as solvents for catalyst activation in the process of this invention) retard the rate of the nucleophilic displacement reaction; so, they are removed from the mixture in Step B by azeotropic distillation. In order to keep the temperature low enough to minimize the decomposition of some quaternary ammonium compounds, especially in the presence of some nucleophiles, it may be necessary to run the distillation at reduced pressure. Optimally, the level of water remaining in the dehydrated phase-transfer catalyst mixture is less than about 1.0 wt %, although up to about 2 wt % water is acceptable in most cases, and the level of residual alcohol should be less than 10 wt %. The lower aqueous waste phase from the distillation is separated from the upper alcohol-rich phase, and the latter phase is saved for re-use in a later cycle.

The process of this invention can be performed by incrementally adding the precursor organic substrate or reactant (optionally mixed with an effective amount of reacion diluent), under agitation, to a reaction vessel containing the dried fluid mixture or slurry of Step B. Preferably, the reaction vessel will be equipped with a stirring, cooling, and heating means so that the mixture can be maintained under agitation and at about 90° to 110° C. during the reaction. The mixture of Step B is preferably heated to the reaction temperature before the organic substrate of Step D is added at a controlled rate.

After completion of the reactor, the reaction product can optionally be recovered by dissolving it in an appropriate washing diluent (especially if the reaction product is highly polar, viscous and/or hazardous) and washing the resultant organic solution one or more times with water. In the case of polymeric products, e.g., glycidyl azide polymer, washing of the organic solution with water-methanol mixtures may be helpful.

The following examples illustrate the present invention and are not to be unnecessarily construed as limiting the scope thereof. FIG. 2 shows the reaction sequence in all of the examples. Although the examples describe the process of the invention applied in a batch mode, the use of continuous processing equipment is within the scope of the invention. The catalyst activation and dehydration steps could be run in a series of stirred tanks with condensers or in a film evaporator modified to allow the pumping of a slurry through the outlet. The displacement reaction step does not evolve volatile materials and could be run in an extruder or a series of stirred tanks. The washing, extraction and solvent recycling steps could be done in standard continuous processing equipment.

EXAMPLE 1

A four-cycle reaction sequence was employed to manufacture glycidyl azide polymer by reacting liquid polyepichlorohydrin with nucleophile derived from solid sodium azide, employing methyltributylammonium chloride as a recycled phase-transfer catalyst. The reaction sequence for this example is shown in TABLE 1. Each ingredient (or material) is given a code number in the table for easier reference in the text; for example, isobutyl alcohol used in Step A is given the code number "(1)".

CYCLE 1

Step A—Reactor Charging

To a 378-L glass-lined reactor, equipped with agitator, was charged 63.5 kg (201 eq) of 75% aqueous methyltributylammonium (MTB) chloride (2) as the phase-transfer catalyst (available from SACHEM Corp..) 44.9 kg of isobutyl alcohol (1), and 46.7 kg (718 eq) of sodium azide (3), the azide added with slow agitation.

Step B—Catalyst Activation

The agitator speed was increased to high, and the pressure in the reactor, 76-L decanter, and 189-L receiver was reduced to 125 torr using a three-stage vacuum jet. Heat was applied to the reactor with a hot water-jacket to distill off water and isobutyl alcohol to the decanter, which was drained to the receiver as required. When the reactor temperature reached 82° C., the pressure was gradually reduced to 40 torr. When the reactor temperature again reached 82° C., the pressure was lowered to 10 torr and heating was resumed. In about 3 minutes after the reactor temperature reached 100° C., vacuum was broken with nitrogen, and 8.3 kg of 1,3-dioxolane (4) was pumped into the reactor as a reaction diluent.

Step C—Alcohol Recovery

From the bottom of the receiver, 6.35 kg of aqueous phase (5) containing 7% isobutyl alcohol was drained and discarded (to the "sewer", or industrial wastewater disposal line). The isobutyl alcohol phase (6) remaining in the receiver (51.7 kg) was drained, analyzed and found to contain 16.9% water. This alcohol solution, representing 95.8% recovery of isobutyl alcohol, was saved for use in Step F of CYCLE 1.

Step D—Reaction

Addition of a pre-blended solution containing 59.4 kg (641 eq) of polyepichlorohydrin (7), $H[OCH(CH_2Cl)CH_2]_m O[CH_2CH(CH_2Cl)O]_n H$ (the sum of m+n had an average of about 24.5), and 10.5 kg 1,3-dioxolane (8) was begun immediately after completion of the drying of Step C, at a rate of 1.0 kg/min, with vigorous agitation and with the reactor temperature controlled at 100° C. After addition of the polyepichlorohydrin solution was complete, 1.3 kg of dioxolane (9) was added to the reactor to flush the pump. Heating and stirring was continued at 100° C. for 2.5 hours. Analysis of a sample of slurry from the reactor by X-ray fluorescence showed a very low concentration of organochlorine. (No nitrogen gas purge was used during this reaction, but was used in CYCLES 3 and 4.)

Step E—First Washing

After the reactor contents were cooled to 40.5° C., washing diluents, consisting of n-butyl butyrate (10) (25.4 kg) and perchloroethylene (11) (76.2 kg), were vacuumed into the reactor, followed by 222 kg of deionized water (12). The reaction mixture was agitated at 100 rpm at 40° C. for 15 minutes, then was allowed to phase-split for 30 minutes. The lower product phase (13) (17.82 kg) containing glycidyl azide polymer was drained for subsequent washing (Step G).

Step F—Catalyst Recovery

To the catalyst-containing aqueous phase remaining in the reactor was added 35.0 kg of sodium chloride (14), 51.7 kg isobutyl alcohol phase (6) recovered from Step C plus 30.4 kg of fresh isobutyl alcohol (15) were vacuumed in, and the reactor was heated to 82° C. with medium agitation. After 15 minutes, the two phases were allowed to split, and 30 minutes later 286.8 kg of lower aqueous phase brine (16) was drained. The upper isobutyl alcohol phase (17), 150.5 kg containing about 30% phase-transfer catalyst (as a mixture of MTB chloride and azide), was saved for use in Step A of CYCLE 2.

Step G—Second Washing

The glycidyl azide polymer product phase (13) from Step E was returned to the reactor and 223 kg deionized water (18) was added. The mixture was stirred at 100 rpm for 30 minutes; then, after a rapid phase split, 169 kg of the lower product phase (19) was drained for a final washing (Step H). The upper aqueous by-product phase (20) (227 kg) was discarded (incinerated).

Step H—Third Washing

The lower glycidyl azide polymer product phase (19) from Step G was finally washed with a solution comprising a mixture of 25.5 kg methanol (21) and 101.8 kg of deionized water (22), by agitating on medium speed at 60° C. for 15 minutes and allowing the mixture to phase-split for 60 minutes. (The methanol was added to facilitate this last phase split.) The bottom phase (23) contained 162.7 kg of glycidyl azide polymer solution in perchloroethylene and butyl butyrate. The upper aqueous phase (24), containing 20% methanol, was saved for recycling into the second washing step (Step G) of CYCLE 2.

Step I—Diluent Removal

A small sample of the lower glycidyl azide polymer product phase (23) from Step H was concentrated under reduced pressure to yield glycidyl azide polymer (27), $H[OCH(CH_2N_3)CH_2]_m O[CH_2CH(CH_2N_3)O]_n H$, (the sum of m+n equals about 23), in a yield of 94.6%, and a purity of greater than 99.5%.

CYCLES 2, 3 AND 4

(For these cycles, as was given for CYCLE 1, amounts of ingredients, with their code numbers, are shown in TABLE 1.)

Step A—Reactor Charging

The reactor was charged with a recycled mixture of phase-transfer catalyst and isobutyl alcohol (17) from the immediately preceding cycle, 75%, aqueous MTB chloride (2) as makeup catalyst, and sodium azide (3); the amount of sodium azide was adjusted by the amount of azide ion supplied by the recycled catalyst-isobutyl alcohol solution (17) (analysis given in TABLE 2) to give a constant 12.5% equivalent excess of azide with respect to the polyepichlorohydrin to be used in Step D. Make-up MTB chloride (2) was similarly adjusted to maintain a molar ratio of phase-transfer catalyst to polyepichlorohydrin of 0.32. The effect of this recycle was to reduce the amount of added azide by an average of 43%, and, more importantly, for economic and environmental considerations, to reduce catalyst usage by an average of 92.5%

Step B—Catalyst Activation

The same procedure used in CYCLE 1 was followed in CYCLES 2, 3 and 4. TABLE 3 gives the analyses of the dried, liquid, phase-transfer catalyst phase, which was decanted from the sodium azide and sodium chloride solids. A target concentration of 10% or less of isobutyl alcohol in the dried catalyst phase was achieved in CYCLES 1–4. (Higher concentrations of alcohol are detrimental for good catalyst recovery in later steps of the process.) The balance of the liquid phase-transfer catalyst phase in CYCLES 2, 3, and 4 was essentially MTB chloride and MTB azide in a 95/5 weight ratio. Water concentration ranged from 0.10% (dried phase-transfer catalyst) to 0.94% (catalyst-glycidyl azide polymer mixture) as shown in TABLE 3. These low water concentrations did not slow the reaction rate.

Step C—Alcohol Recovery

The aqueous phase (5) and isobutyl alcohol phase (6) were handled as in CYCLE 1, i.e., the aqueous phase was discarded (to the sewer) and the alcohol phase saved for use in Step F of the next cycle. The compositions of both phases for all 4 cycles are given in TABLE 4.

Step D—Reaction

The conversion of polyepichlorohydrin to glycidyl azide polymer for CYCLES 2, 3, and 4 was carried out as described in CYCLE 1, i.e., reacting at 100° C. for 2.5 hours after the addition of polyepichlorohydrin was complete. According to the data in TABLE 5, analysis by x-ray fluoresence of a 25 wt % solution of product in diisobutyl ketone before and after washing showed very low organochlorine concentration (well below a maximum organochlorine specification of 0.040 wt %), indicating high conversion to glycidyl azide polymer. In CYCLES 3 and 4, a strong nitrogen purge through the reactor to the vent was used throughout the 2.5 hour reaction period in order to decrease the concentration of the organic diluent, 1,3-dioxolane. This diluent had become a significant component of the recycled isobutyl alcohol phase (6) and had caused less efficient phase separations (see analytical data in TABLE 4). Without a nitrogen purge to remove dioxolane, the phase separation in Step C of later cycles would be very ineffective.

Step E—First Washing

After addition of the butyl butyrate and perchloroethylene, the first aqueous wash was carried out as in CYCLE 1. In spite of repeated recycling of phase-transfer catalyst, very similar amounts of catalyst (about 94%) were recovered by the first washing in CYCLES 2, 3 and 4 compared CYCLE 1.

Step F—Catalyst Recovery

Extraction of phase-transfer catalyst from the aqueous phase was accomplished as described in CYCLE 1, except that much less make-up isobutyl alcohol (15) was needed, the savings on fresh alcohol in CYCLES 2, 3 and 4 compared with CYCLE 1 averaging about 94%. Gas chromatographic analyses of the catalyst-depleted brine (16) are given in TABLE 6. All of the washing diluent (perchloroethylene and butyl butyrate) blend was completely salted out of the brine phase. Extensive analyses of the recycled catalyst-alcohol phase (17) are given in Table 2.

Step G—Second Washing

The second washing was carried out as in CYCLE 1, except that aqueous phase from the third washing in CYCLE 1 replaced about 60% of the wash water. The collected amounts of twice-washed product phase (19) were almost the same for CYCLES 2, 3 and 4. Analyses of the aqueous phase from the second washing (20) of each cycle are listed in TABLE 7, showing a relationship between the concentration of dioxolane, isobutyl alcohol, and MTB catalyst. When the dioxolane concentration was reduced by purging in CYCLES 3 and 4, dioxolane and alcohol concentrations decreased and MTB catalyst concentration stopped increasing.

Step H—Third Washing

This was performed in the same manner as in CYCLE 1. For each cycle, the small variations in the weight of glycidyl azide polymer phase after three washes (23) were determined to be due to varying low concentrations of dioxolane, methanol, water, and alcohol, and not of the phase-transfer catalyst. The yield of glycidyl azide polymer for each cycle, based on polyepichlorohydrin fed and the percentage glycidyl azide polymer in (23) was determined by solvent removal from small samples of glycidyl azide polymer solution, and was found to be respectively: 94.4% for CYCLE 2; 94.6% for CYCLE 3; and 97.1% for CYCLE 4.

Step I—Diluent Removal

A single campaign was made for CYCLES 1–4 to remove the diluent from the product by using continuous evaporation. Each of wo wiped-film evaporators (WFEs), in series with a heated film-wiping area of 1115 cm², each were fed sequentially the product phase washed 3 times from CYCLES 1–4 under the following conditions:

Average feed rate=20.5 kg/hr of about 38% glycidyl azide polymer solution

| | |
|---|---|
| WFE vacuum #1: | 22 torr |
| WFE vacuum #2: | 2 torr |
| WFE jacket temperature: | 110° C. |
| WFE #1 Condenser temperature: | 10° C. |
| WFE #2 Condenser temperature: | −32° C. |
| WFE #1 residue temperature: | 54° C. |
| WFE #2 residue temperature: | 72° C. |

The average concentration of residual washing diluent in the desired glycidyl azide polymer product was only 0.07 wt %.

The optimum feed rate to maintain a level of less than 0.1% residual solvent was 23.6 kg/hr. A total of 236 kg of glycidyl azide polymer was produced via the dual wiped-film evaporators. The above conditions gave a 90% overall recovery of organic diluent; over 95% of the recovered diluent was condensed by the first wiped-film evaporator. The composition of condensate from both wiped-film evaporators is given in TABLE 8 as a function of the wiped-film evaporator number and the number of recycles. The small differences in washing diluent compositions between CYCLES 1 and 4 indicate that the diluent is as recyclable as the alcohol and phase-transfer catalyst.

Step J—Brine Treatment

The phase-transfer catalyst-depleted brine solution produced by the catalyst recycle (Step F) of CYCLE 2 was treated in the lab to destroy residual azide in order to make this stream biotreatable. To a 2-L glass flask fitted with a stirrer and thermometer was added 1138 g of catalyst-depleted brine (containing 0.15 equivalents of azide ion), 22.5 g (0.45 eq) of 30% aqueous ammonia, and 67.5 g (0.45 eq) of 41% aqueous sodium nitrite (DuPont). With good stirring, 46 g (0.45 eq) of 96% sulfuric from an additional funnel acid was added dropwise over 30 minutes. As the pH of the stirred mixture dropped, the temperature rose from 25° to 35° C. and azide destruction became apparent by gas evolution (comprising $N_2$ and $N_2O$) mid-way through the acid addition. A sample of this treated brine passed important environmental wastewater tests (sludge respiration inhibition of only 18% and a daphnia no-effect dilution ratio of 267), demonstrating that typical biotreatment facilities can handle this by-product solution.

EXAMPLE 2

In this example, the preparation of 3,6-dioxadecyl thiocyanate, in two cycles, from 3,6-dioxadecyl chloride and sodium thiocyanate is described using N-(2-methylbutyl)-4-dimethylaminopyridinium thiocyanate as the activated phase-transfer catalyst.

A solution of activated phase-transfer catalyst was prepared by metathesis of N-(2-methylbutyl)-4-dimethylamino-pyridinium chloride (MBD chloride) with sodium thiocyanate. To a 2-L glass bottom-draining flask, fitted with a stirrer and thermometer, was added, with stirring, 144 g deionized water and 102 g (0.44 eq) of $[C_2H_5CH(CH_3)CH_2NC_5H_4—N(CH_3)_2]^+[Cl]^-$ (MBD chloride) (available from Parish Chemical Co.), which rapidly formed a homogenous aqueous solution. 2-Methyl-1-butanol (168 g) was then added and the reaction mixture heated to 80° C. to yield a homogeneous solution. Then 79.4 g (0.98 eq) of granular NaSCN was added and, after it had dissolved over a several minute time period, the two liquid phases which formed were allowed to separate at 80° C. The bottom phase, comprising 150 g of a NaCl-NaSCN brine solution, was drained and discarded. The upper phase comprised 337 g of a 33 weight % alcohol solution [0.33 g (1.3 meq)/g solution] of the phase-transfer reagent, MBD thiocyanate, $[C_2H_5CH(CH_3)CH_2NC_5H_4—N(CH_3)_2]^+[SCN]^-$.

CYCLE 1

In Table 9, the letters A, B, C, et cet. refer to steps in the cyclic process—see FIG. 2. Numbers in parentheses refer to the various ingredients, materials, or process streams.

Step A—Reactor Charging

To a 2-L glass bottom-draining flask, fitted with a stirrer and thermometer, was charged 171.8 g (222 meq) of MBD thiocyanate solution (2) prepared above, 74.5 g (404 meq) of 3,6-dioxadecyl chloride (3) (prepared in 98% purity by reaction of diethylene glycol monobutyl ether with thionyl chloride followed by distillation of product), and 74.3 g (900 meq) of NaSCN. (The 3,6-dioxadecyl chloride (3)—part of the total charge—is used in this step as a diluent. The balance of this reagent is added in Step D below.)

Step B—Catalyst Activation

The agitator speed was increased to high, and the pressure in the flask and the 500 mL receiver (to which the flask was connected) was reduced to 40 torr using a vacuum pump. Heat was applied to the reactor with two infrared lamps to distill off water and 2-methyl-1-butanol to the receiver. About 0.5 hour after the reactor temperature had reached 115° C., the distillate in the receiver was recovered (Step C) and the pressure was reduced to 25 torr without any further distillate condensed.

Step C—Alcohol Recovery

The receiver contents were placed in a separatory funnel, and the water phase (5) (15.1 g) was removed and discarded. The 2-methyl-1-butanol phase (6) remaining in the funnel (83 g) was drained and saved for use in Step F later in the run.

Step D—Reaction

To the non-volatile residue from Step B was added 60.8 g (330 meq) of 3,6-dioxadecyl chloride (7) to give a total reactive organic substrate charge of 135.3 g (734 meq). The addition of (7) to a well-agitated reactor at 115° C. was carried out over a period of about 5 minutes (for this reaction, no organic diluent (8) was added). After addition, the reaction mixture temperature was kept at 115° C. for 4.25 hours. Gas chromatographic analysis of a sample of the reaction product showed greater than 99% conversion to 3,6-dioxadecyl thiocyanate, $C_4H_9OC_2H_4OC_2H_4SCN$.

Step E—First Washing 186 g of ethyl pivalate (9) washing diluent and 371 g of deionized water (11) were added to the reactor. After allowing the reactor contents to cool to 30° C. with good agitation, stirring was stopped and the three phases which formed were allowed to separate. The lowest clear aqueous phase (12) (415 g) and the middle reddish-brown aqueous catalyst-rich phase were drained separately and saved for Step F. The top organic product phase (85.1 g) was retained in the reactor for the second washing (Step G).

Step F—Catalyst Recovery

The aqueous wash phase (12) from Step E, 48.9 g of NaCl (14), 83 g of recycled 2-methyl-1-butanol phase (6) from Step C, and 10 g of fresh 2-methyl-1-butanol (15) were placed in a clean 2 L flask with bottom drain. After the well-agitated mixture reached 82° C., the phases were allowed to split, and 451.4 g of lower aqueous brine phase (16) was drained. Prior to disposal, phase (16) was found to contain only 0.4% 2-methyl-1-butanol (gas chromatographic analysis) and only 0.4% of the original MBD charge (by ultraviolet spectroscopy). To the 96.7 g of the upper 2-methyl-1-butanol phase (17), containing 6.5% of the original phase-transfer catalyst charge, was added 82.1 g of the reddish-brown catalyst-rich phase from Step E, containing 89% of the original catalyst charge. This recycled phase-transfer catalyst solution was saved for CYCLE 2.

Step G—Second Washing

To the reaction flask, still containing the product phase from the first washing (Step E), was added 371.3 g of water (18), the mixture was highly agitated at 25° C. for 5 minutes, and then was allowed to phase split. 374.3 g of lower aqueous phase (19), containing 0.3% organic displacement product and about 3.5% of the original phase-transfer catalyst, was drained and saved as part of the aqueous input to the first washing (Step E) of CYCLE 2.

Step H—Third Washing

To the reaction flask, still containing the product phase from Step G, was added 247.4 g of water (20), the mixture was highly agitated at 25° C. for 5 minutes, and then was allowed to phase split. 248 g of the lower aqueous phase (21) was drained and analyzed by high pressure liquid chromatography; it was found to contain only 0.3% of the original concentration of phase-transfer catalyst and was saved as part of the aqueous input to the second washing (Step G) of CYCLE 2.

Step I—Diluent Removal

The 316 g of thrice-washed product phase (22) remaining in the reaction flask from Step H was freed of wash solvent by vacuum stripping at 25 torr and heating using two infrared heat lamps. When the product temperature reached 100° C., 182.5 g of recycled ethyl pivalate (23) containing 0.8% 2-methyl-1-butanol (by gas chromatographic analysis), was recovered from the receiver and dry ice trap and was saved for input to Step E (first washing) of CYCLE 2. The product was heated at 100° C. and was further vacuum stripped for 20 minutes at 10 torr under a nitrogen purge to yield 131.2 g of 3,6-dioxadecyl thiocyanate product (24) (86.4% yield) having a purity of 96.3% and containing less than 0.7% of 3,6-dioxadecyl chloride starting reactant (by gas chromatographic analysis).

CYCLE 2

(Recycle run, using recycled phase-transfer catalyst, alcohol and organic diluent).

Step A—Reactor Charging

To the 2 L glass bottom-draining flask used in Step E of CYCLE 1 and still containing 177 g (214 meq) of recycled phase-transfer catalyst solution in alcohol (1) from Step F of CYCLE 1 were added: 6.6 g (8.5 meq) of phase-transfer catalyst make-up solution, giving a total of 183.6 g (222.5 meq) of MBD thiocyanate/2-methyl-1-butanol solution; 54.1 g (294 meq) of 3,6-dioxadecyl chloride (3) (part of total charge—see Step D below); and 66.9 g (835 meq) of NaSCN (4).

Step B—Catalyst Activation

This was done in the same manner as in CYCLE 1, except that the pressure was reduced to 9 torr immediately after the reactant mixture reached 115° C. Alcohol (12 g), distilling out at 9 torr, was saved for Step C along with that saved prior to the pressure reduction.

Step C—Alcohol Recovery

The receiver contents were placed in a separatory funnel. The water phase (5), 22.5 g containing only 4% 2-methyl-1-butanol and 0.05% organic reactant, was discarded. The alcohol phase (6) was drained and the alcohol collected from the distillation at 9 torr (Step B) was added to it. This mixture (6), totalling 107 g and containing 12% reactant and 9% water, was saved for use in Step F later in this cycle.

Step D—Reaction

The balance of the organic reactant 3,6-dioxadecyl chloride (7), $C_4H_9OC_2H_4OC_2H_4Cl$ (81.3 g, 441 meq; total with reactant from (3) of 135.4 g, 735 meq), was added to a well-agitated reactor at 115° C. and was carried out over a period of about 3 minutes. After addition, the reaction mixture was heated at 115° C. for 3.0 hours. Gas chromatographic analysis of a sample of the product showed 98.3% conversion to 3,6-dioxadecyl thiocyanate, $C_4H_9OC_2H_4OC_2H_4SCN$.

Step E—First Washing 181 g of recycled ethyl pivalate washing diluent (23) from Step I of CYCLE 1, 5 g of fresh make-up ethyl pivalate (9) and 346.4 g of the aqueous phase (19) from Step G of CYCLE 1, and 24.6 g of deionized water (11) were added to the reactor. After letting the reactor contents cool to 30° C. with good agitation, stirring was stopped and the three phases which formed were allowed to separate. 402.2 g of lowest clear aqueous phase (12) and 82.7 g of the middle reddish-brown aqueous catalyst-rich phase (13), containing 11% product (by gas chromatographic analysis), were drained separately and saved for Step F. The upper product phase was retained in the reactor for the second washing (Step G).

Step F—Catalyst Recovery

The 402.2 g aqueous wash (12) from Step E, 48.9 g of NaCl (14), 105.5 g of recycled 2-methyl-1-butanol phase (6), and 3.8 g of fresh 2-methyl-1-butanol (15) were placed in a clean 2 L flask with bottom drain. After the well-agitated mixture reached 82° C., the phases were allowed to split, and 444.5 g of lower aqueous brine phase (16) was drained and analyzed; it was found to contain only 0.7% of the original phase-transfer catalyst charge and was discarded. The 114.0 g of upper 2-methyl-1-butanol phase (17) and the reddish-brown catalyst-rich phase (13) from Step E were saved for a future cycle.

Step G—Second Washing

To the reaction flask, still containing the product phase from Step E, was added 234.6 g of aqueous phase (21) from Step H of CYCLE 1 and 136.6 g of water (18). The mixture was highly agitated at 25° C. for 5 minutes and then was allowed to phase split. The lower aqueous phase (19) (373.2 g) was drained and saved as an input to Step E for a future cycle.

Step H—Third Washing

To the reaction flask, still containing the product phase from Step G, was added 247.2 g of water (20). The mixture was highly agitated at 25° C. for 5 minutes and then was allowed to phase split. The lower aqueous phase (21) (248.2 g), containing 0.4% of the original phase-transfer catalyst (by ultraviolet spectroscopy), was drained and saved as part of the aqueous input for Step G of a future cycle.

Step I—Diluent Removal

The 317.0 g of triply washed product phase (22) was freed of washing diluent by vacuum stripping at 25 torr using 2 infrared heat lamps. When the product temperature reached 100° C., 181.4 g of 98% pure recycled ethyl pivalate (23), containing 0.6% 2-methyl-1-butanol as the only impurity (by gas chromatographic analysis), was recovered from the receiver and dry ice trap and was saved as an input to Step E of a future run. The product was further stripped for 20 minutes at 100° C. and 10 torr vacuum under a nitrogen purge to produce 135.1 g of 3,6-dioxadecyl thiocyanate (24), having a purity of 96.4% and containing 1.7% 3,6-dioxadecyl chloride starting reactant (by gas chromatographic analysis). The yield was calculated to be 103%, showing that a significant amount of organic product present in the phase-transfer catalyst alcoholic solution and other streams recycled from CYCLE 1 was recovered in CYCLE 2.

Comparative Example A 3,6-Dioxadecyl thiocyanate was made in the same manner as in CYCLE 1 of Example 2, except that in place of the twelve carbon-containing phase-transfer catalyst, a fifteen carbon-containing phase-transfer catalyst, N-(2-ethylhexyl)-4-dimethylaminopyridinium (EHD) thiocyanate was used.

To a reaction mixture containing about 152 g of 3,6-dioxadecyl thiocyanate organic displacement product made as in Steps A, B, C, and D of Example 2, 55.8 g of EHD thiocyanate, about 12 g NaSCN, and about 44 g NaCl were added 135 g of isobutyl pivalate (a washing diluent of very low polarity made by reacting isobutyl alcohol with pivaloyl chloride), and 368 g of water. After mixing, two phases resulted, with the upper product phase still rich in phase-transfer catalyst. 403 g of lower aqueous phase was drained, analyzed by ultraviolet spectroscopy, and was found to contain only 0.9% of the total phase-transfer catalyst, whereas in CYCLE 1 of EXAMPLE 2, the first washing (Step E) removed 96% of the total catalyst. This demonstrates that a phase-transfer catalyst containing 15 carbon atoms per nitrogen atom, when paired with a "soft" nucleophile such as thiocyanate, is not easily removed from the reaction product using aqueous water washes, and thus cannot be efficiently recovered for reuse in a subsequent cycle of the process.

EXAMPLE 3

Glycidyl azide polymer, as prepared using Steps A, B, C, and D of EXAMPLE 1, was mixed with washing diluents, with N-(2-ethylhexyl)-4-dimethylaminopyridinium (EHD) chloride and azide, with sodium chloride and azide, and was washed with water to separate the EHD phase-transfer catalyst from the glycidyl azide polymer.

To a reaction mixture in a 2-L flask containing 361 g glycidyl azide polymer (prepared as in the glycidyl azide polymer example), 191 g of a mixture of N-(2-ethylhexyl)-4-dimethylaminopyridinium (EHD) chloride and EHD azide (from Parish as EHD chloride prior to the reaction), 213 g of NaCl by-product, and no more than 16 g of excess $NAN_3$, were added 108 g of isobutyl isobutyrate, 433 g of perchloroethylene and 505 g of water. The mixture was agitated and heated to 60° C. and was then allowed to separate into two phases, with 930 g in the lower organic product phase and 896 g in the upper aqueous phase. The aqueous phase, analyzed by high performance liquid chromatography, was determined to have removed 86% of the EHD salts orginally charged. Thus, the lower degree of lipophilicity for the "hard" azide anion versus the "soft" thiocyanate anion of the previous comparative example permitted a more lipophilic phase-transfer catalyst cation to be effectively removed with water.

EXAMPLE 4

This example illustrates the preparation of 3,3-bis (azidomethyl)oxetane by reaction of 3,3-bis(bromomethyl) oxetane with sodium azide, using methyltributylanunonium chloride as a recoverable phase-transfer catalyst which can be recycled.

CYCLE 1

Steps A, B and B—Reactor Charging, Catalyst Activation and Alcohol Recovery

A 2-liter three-necked round-bottomed flask equipped with a bottom drain, mechanical stirrer, thermometer, addition funnel and take-off to a receiver with a vertical condenser connected to a water aspirator was charged with 315.1 g of a 75% solution of methyltributyl ammonium chloride (1.00 eq), 275.2 g of sodium azide (4.23 eq), and 280 g of methyl amyl alcohol. The well-agitated mixture was heated with infrared lights to 80° C., and an azeotropic mixture of water and methyl amyl alcohol was removed by vacuum distillation beginning at 160 torr. As the volatile material was removed, the batch temperature was raised to 103° C. and the pressure reduced to 15 torr. The volatile fraction collected was 276 g, of which 48 g was a lower aqueous phase and 228 g was an alcohol-rich phase. A portion of the fluid suspension in the flask (219 g) was removed for later work. The take-off was replaced with a reflux condenser.

Step D—Reaction

To the remaining dehydrated slurry in the flask (375 g) was added by an addition funnel over a 25 minute time period a solution of 244 g (2.0 eq) of 3,3-bis(bromomethyl) oxetane and 44 g of ethyl pivalate. At first there was a noticeable exotherm but, after part of the solution had been added, it became necessary to heat the reaction mixture to maintain its temperature. After completion of the addition, the reaction mixture was stirred and heated in the range of 85°–105° C. for 2 hours and 50 minutes. Samples were taken approximately every half-hour, mixed with water, and their upper phase separated and analyzed by gas chromatography (comparing retention times with those of previously synthesized product), showing that the reaction was greater than 99% complete after i hour and 40 minutes.

Steps E, G and H—Washings

The cooled reaction mixture was diluted with 175 g of ethyl pivalate and washed with 300 g of water at 40° C. Three phases formed when the mixture was allowed to stand: a top phase of mostly organic product and diluent; a mid-phase containing mostly quaternary ammonium salts; and a bottom phase containing mostly water and sodium bromide. The top phase was washed twice with 200 g of water, resulting in a lower aqueous phase (361 g) rich in quaternary ammonium salt (which was put aside for recycling) and an upper organic phase, which was washed with 100 g of water and 25 g of methanol, yielding 360 grams of organic product solution.

Step F—Catalyst Recovery

Sodium chloride (85 g) was added to the 361 g of quaternary ammonium salt-rich aqueous phase saved from the earlier washings, and the mixture was heated to 60° C. Two liquid phases formed, along with a bottom residue of undissolved sodium chloride. Methyl amyl alcohol (103 g) earlier recovered from Step C was added and the mixture was agitated, then allowed to stand at 60° C. to separate into phases. The upper phase (216 g) was separated from the lower brine phase and the undissolved salt.

CYCLE 2

Steps A, B, C and D—Reactor Charging, Catalyst Activation, Alcohol Recovery and Reaction To 25.0 g of the upper phase from Step F of CYCLE 1 in a 100-mL round-bottomed flask, 14.0 g (0.215 eq) of sodium azide was added, and the resulting mixture was stripped of alcohol and water on a rotary evaporator at a bath temperature of 80° C. and a final pressure of 60 torr, providing 32.3 g of catalyst slurry. To this slurry was added 24.0 g of ethyl pivalate and 24.4 g (0.20 eq) of 3,3-bis(bromomethyl) oxetane. The flask was immersed in an oil bath at 100° C. and was agitated using a magnetic stirrer. After two hours reaction time, the dibromo compound had been converted to the diazide.

EXAMPLE 5

This example illustrates the preparation of 1,6-diazidohexane by reaction of 1,6-dibromohexane with sodium azide using methyltributylammonium chloride as a recyclable phase-transfer catalyst.

CYCLE 1

Step D—Reaction

A glass vial was charged with 3.1 g ,of the methyltributylammonium chloride/sodium azide slurry prepared in the first step of EXAMPLE 4, 2.0 g of isobutyl isobutyrate and 2.43 g (0.020 eq) of 1,6-dibromohexane. A magnetic stirrer was placed in the vial, which was capped and immersed in an oil bath at 100° C., and the mixture was stirred for two hours.

Step E—First Washing

The reaction mixture was cooled, diluted with 10 g of water, shaken and allowed to separate into phases. Analysis of the upper phase by gas chromatography showed that 99.93% (peak area ratios) of the 1,6-dibromohexane had been converted to 1,6-diazidohexane. The upper product phase (3.65 g) was removed using a pipet.

Step F—Catalyst Recovery

To the lower (aqueous) phase from Step E was added 4.0 g of potassium chloride, and the solution was warmed to 60° C., forming two liquid phases. Methyl amyl alcohol recovered from Step B of EXAMPLE 4 (2.0 g) was added and the mixture shaken, then allowed to split into phases. The upper phase (3.72 g) was separated by pipet from the lower brine phase.

CYCLE 2

Steps A, B, C and D—Reactor Charging, Catalyst Activation, Alcohol Recovery and Reaction To this upper catalyst-containing phase (Step F of CYCLE 1) was added 1.41 g (0.0217 eq) of sodium azide in a 50-mL round-bottomed flask. The water and alcohol were removed using a rotary evaporator with a bath temperature of 80° C. at a pressure of 60 torr, resulting in 3.25 g of catalyst slurry. To this slurry was added 2.0 g of isobutyl isobutyrate and 2.48 g (0.020 eq) of 1,6-dibromohexane. After adding a magnetic stirrer, the flask was heated in an oil bath at 100° C. with stirring. After one hour, a small sample was removed, was diluted with water, and the upper phase was analyzed by gas chromatography, showing that the reaction was not complete. Therefore, an additional 0.57 g of the azide slurry prepared in EXAMPLE 4 was added to the reaction mixture, which was heated for one more hour at 100° C., after which analysis by gas chromatography showed greater than 99% conversion of the organic substrate.

EXAMPLE 6

This example illustrates the preparation of 1,6-diazidohexane by reaction of 1,6-dichlorohexane with sodium azide using methyltributylammonium chloride as a recyclable phase-transfer catalyst.

CYCLE 1

Step D—Reaction

A glass vial was charged with 3.1 g of the methyltributyl ammonium chloride/sodium azide slurry prepared in Steps A, B and C of EXAMPLE 4, 2.0 g of isobutyl isobutyrate and 1.55 g (0.02 meq) of 1,6-dichlorohexane. A small magnetic stirring bar was placed in the vial, which was capped and immersed in an oil bath at 100° C., and the reaction mixture was stirred for two hours.

Step E—Washing

The reaction mixture was then cooled, diluted with 10 g of water, shaken, and was allowed to separate into two phases. Analysis of the upper phase by gas chromatography showed that 100% (peak area ratios) of the 1,6-dichlorohexane had been converted to 1,6-diazidohexane product. The upper product phase (3.50 g) was removed using a pipet.

Step F—Catalyst Recovery

To the lower aqueous, catalyst-containing phase was added 4.0 g of potassium chloride, and the solution was warmed to 60° C. Recovered methyl amyl alcohol from Step B of EXAMPLE 4 (2.0 g) was added, the mixture was shaken, then was allowed to split into two phases at 60° C. The upper phase (3.73 g) was separated by pipet from the lower brine phase.

CYCLE 2

Steps A, B, C and D—Reactor Charging, Catalyst Activation, Alcohol Recovery and Reaction To the upper catalyst-containing phase from Step F of CYCLE 1 was added 1.40 g (0.0216 eq) of sodium azide in a 50-mL round-bottomed flask. The water and alcohol were removed using a rotary evaporator with a bath temperature of 80° C. at a pressure of 60 torr, resulting in 2.84 g of catalyst slurry. To this slurry was added 2.0 g of isobutyl isobutyrate and 1.55 g (0.020 eq) of 1,6-dichlorohexane. The flask was heated in an oil bath at 100° C. while the mixture was agitated using a magnetic stirrer. After one hour, a small sample was removed, was diluted with water, and analysis of the upper phase (by gas chromatography) showed that the reaction was 99.9% complete.

Various modifications and alterations of this invention will become apparent to those skilled in the art.

TABLE 2

| | Amt (wt %) of ingredients in catalyst-alcohol solution (17) Cycle | | | |
|---|---|---|---|---|
| Ingredient | 1 | 2 | 3 | 4 |
| Dioxolane | 5.0 | 7.9 | 9.7 | 8.1 |
| Isobutyl alcohol | 52.4 | 48.0 | 50.6 | 53.1 |
| Perchloroethylene | 0.3 | 0.53 | 0.97 | 0.95 |
| Butyl Butyrate | 0.11 | 0.21 | 0.12 | 0.40 |
| Water | 16.8 | 16.1 | 16.9 | n/a |
| Azide (as $NaN_3$) | 1.61 | 1.35 | 1.83 | 1.45 |
| MTB catalyst (as chloride) | 31.8 | 30.8 | 30.9 | 29.9 |

TABLE 3

| | Amt (wt %) of ingredients in dried catalyst Cycle | | | |
|---|---|---|---|---|
| Ingredient | 1 | 2 | 3 | 4 |
| Dioxolane | 11.9 | 12.7 | 10.9 | 11.9 |
| Isobutyl alcohol | 1.4 | 6.4 | 10.0 | 8.46 |
| Perchloroethylene | 0.0 | 0.0 | 0.0 | 0.0 |

TABLE 1

| Steps | Ingredients | Amount, kg (equiv) Cycle | | | |
|---|---|---|---|---|---|
| | | 1 | 2 | 3 | 4 |
| A | Isobutyl alcohol (1) | 44.9* | | | |
| A | catalyst phase (17) | | 150.5 (190) | 148.6 (194) | 139.5 (183) |
| A | MTB chloride, 75% aqueous (2) | 63.6 (202) | 3.9 (12.4) | 4.3 (13.7) | 5.9 (18.8) |
| A | Sodium azide (3) | 46.8 (718) | 44.5 (685) | 45.0 (692) | 44.5 (695) |
| B, C | 1,3-dioxolane (4) | 8.3 | 8.3 | 8.3 | 8.3 |
| B, C | Aqueous phase (5) | 6.4 | 8.2 | 7.5 | 9.5 |
| B, C | Isobutyl alcohol phase (6) | 51.8 | 85.9 | 96.4 | 84.1 |
| D | Polyepichlorohydrin (7) | 59.4 (642) | 59.4 (642) | 59.4 (642) | 59.4 (642) |
| D | Dioxolane (8) | 10.5 | 10.5 | 10.5 | 10.5 |
| D | Dioxolane (9) | 1.3 | 1.3 | 1.3 | 1.3 |
| E | Butyl butyrate (10) | 25.5 | 25.5 | 25.5 | 25.5 |
| E | Perchloroethylene (11) | 76.4 | 76.4 | 76.4 | 76.4 |
| E | Deionized water (12) | 222.3 | 222.3 | 222.3 | 222.3 |
| E | Product phase (13) | 178.2 | 192.7 | 180.9 | 183.6 |
| F | Sodium chloride (14) | 35.0 | 35.0 | 35.0 | 35.0 |
| F | Make-up IBA (15) | 30.5 | 5.4 | 0 | 9.5 |
| F | Catalyst-depleted brine (16) | 296.8 | 288.6 | 309.1 | 290.9 |
| F | Recycled catalyst/IBA (17) | 150.5 | 148.6 | 139.5 | 145.0 |
| G | Deionized water (19) | 223 | 93.6 | 85.4 | 88.2 |
| G | Organic product phase (19) | 169 | 175 | 172 | 177 |
| G | Aqueous phase (20) | 227 | 232 | 226 | 209 |
| H | Methanol (21) | 25.5 | 25.5 | 25.5 | 25.5 |
| H | Deionized water (22) | 101.8 | 101.8 | 101.8 | 101.8 |
| H | Organic product phase (23) | 162.7 | 164.1 | 163.6 | 165.9 |
| H | Aqueous phase (24) | 129.5 | 137.7 | 134.5 | 134.1 |
| I | Total product phase (25) | 629 kg (total of 4 cycles) | | | |
| I | Total recycled diluent (26) | 354 kg (total of 4 cycles) | | | |
| I | Total organic product (27) | 236 kg (total of 4 cycles) | | | |

*CYCLE 1 used all fresh materials. Fresh isobutyl alcohol (1) was used only in CYCLE 1. At the end of CYCLES 1, 2, and 3, phase-transfer catalyst and alcohol were recycled into the next cycle.

TABLE 3-continued

| | Amt (wt %) of ingredients in dried catalyst Cycle | | | |
|---|---|---|---|---|
| Ingredient | 1 | 2 | 3 | 4 |
| Butyl Butyrate | 0.10 | 0.04 | 0.08 | 0.18 |
| Water | 0.10 | 0.18 | n/a | 0.4 |

TABLE 4

| | | Amount (wt %) of ingredient in phase and isobutyl alcohol phase (6) Cycle | | | |
|---|---|---|---|---|---|
| Phase | Ingredient | 1 | 2 | 3 | 4 |
| Water | Dioxolane | 0.0 | 13.3 | 33.0 | 26.0 |
| Water | Isobutyl alc. | 7.0 | 9.4 | 24.0 | 29.0 |
| Water | Perchloroethyl. | 0.0 | 0.0 | 0.6 | 0.3 |
| Water | Butyl butyrate | 0.0 | 0.0 | 0.0 | 0.0 |
| Water | Water | 93.0 | 77.3 | 71.7 | 44.7 |
| IBA | Dioxolane | 0.0 | 7.4 | 3.4 | 28.2 |
| IBA | Isobutyl alc. | 73.8 | 66.4 | 73.3 | 63.8 |
| IBA | Perchloroethyl | 0.0 | 0.46 | 0.27 | 0.23 |
| IBA | Butyl butyrate | 0.0 | 0.29 | 1.17 | 1.02 |
| IBA | Water | 16.9 | 19.7 | 19.0 | 35.0 |

TABLE 5

| | Cycle | | | |
|---|---|---|---|---|
| Ingredient | 1 | 2 | 3 | 4 |
| Amount of Cl at end of reaction, wt % | 0.009 | 0.010 | 0.008 | 0.010 |
| Amt. of Cl at end of process wt % | 0.0049 | 0.0064 | 0.0047 | 0.0055 |

TABLE 6

| | Composition of catalyst-depleted brine (16), wt % Cycle | | | |
|---|---|---|---|---|
| Ingredient | 1 | 2 | 3 | 4 |
| Dioxolane | 1.18 | 1.76 | 1.82 | 1.99 |
| Isobutyl alcohol | 0.66 | 0.58 | 0.58 | 0.67 |
| Perchloroethylene | 0.00 | 0.00 | 0.00 | 0.00 |
| Butyl butyrate | 0.00 | 0.00 | 0.00 | 0.00 |

TABLE 7

| | Composition of phase (20) from 2nd washing, wt % Cycle | | | |
|---|---|---|---|---|
| Ingredient | 1 | 2 | 3 | 4 |
| Methanol | 0.00 | 13.37 | 20.1 | 14.04 |
| Dioxolane | 2.31 | 3.48 | 3.36 | 2.85 |
| Isobutyl Alcohol | 0.26 | 0.64 | 1.41 | 1.03 |
| Perchloroethylene | 0.027 | 0.036 | 0.044 | 0.042 |
| Butyl Butyrate | 0.018 | 0.034 | 0.050 | 0.031 |
| Azide, as NaN$_3$ | 0.081 | 0.097 | 0.20 | 0.16 |
| Catalyst as MTB Chloride | 0.62 | 0.91 | 1.5 | 1.53 |

TABLE 8

| | Composition of diluent condense, wt % | | | |
|---|---|---|---|---|
| | WFE #1 Condensate | | WFE #2 Condensate | |
| | Cycle 1 | Cycle 2 | Cycle 3 | Cycle 4 |
| Methanol | 0.25 | 0.19 | 0.010 | 0.011 |
| 1,3-Dioxolane | 0.86 | 1.01 | 0.082 | 0.12 |
| Isobutyl alcohol | 0.21 | 1.06 | 0.41 | 0.13 |
| Perchloroethylene | 72.1 | 72.2 | 25.1 | 36.0 |
| Butyl butyrate | 26.5 | 25.3 | 44.3 | 54.4 |
| Tributylamine | 0 | 0 | 0.078 | 0.015 |

TABLE 9

| | | Amount, kg (meg) Cycle | |
|---|---|---|---|
| Step | Ingredient | 1 | 2 |
| A, B | Recycle catalyst phase (13, 17) | | 177 (214) |
| A, B | MTB thiocyanate solution (2) | 171.8 (222) | 6.6 (8.5) |
| A, B | 3,6-Dioxadecyl chloride (3) | 74.5 (404) | 54.1 (294) |
| A, B | Sodium thiocyanate (4) | 74.3 (900) | 66.9 (835) |
| C | Aqueous phase (5) | 15.1 | 22.5 |
| C | 2-Methyl-1-butanol phase (6) | 83 | 107 |
| D | 3,6-Dioxadecyl chloride (7) | 60.8 (330) | 81.3 (441) |
| D | Dioxolane (8) (not used) | 0 | 0 |
| E | Ethyl pivalate (9) | 186 | 5 |
| E | Ethyl pivalate (10) (recycled) | 0 | 181 |
| E | Deionized water (11) or/and aqueous phase (19) | 371 | 25 346.4 |
| E | Aqueous phase | 415 | 402.2 |
| E | Phase-transfer catalyst phase (13) | 85.1 | 82.7 |
| F | Sodium chloride (14) | 48.9 | 48.9 |
| F | Make-up alcohol (15) | 10 | 3.8 |
| F | Catalyst-depleted brine (16) | 451.4 | 444.5 |
| F | Recycled catalyst (17) | 96.7 | 114.0 |
| G | Deionized water (18) and/or aqueous phase (21) | 371.3 | 136.6 234.6 |
| G | Aqueous phase (19) | 374.3 | 373.2 |
| H | Deionized water (20) | 247.4 | 247.2 |
| H | Aqueous phase (21) | 248 | 248.2 |
| I | Product phase (22) | 182.5 | 181.4 |
| I | Recycled ethyl pivalate (23) | 182.5 | 181.4 |
| I | Final product | 131.2 | 135.4 |

I claim:

1. A process for making an organic product using phase transfer catalysis and via nucleophilic displacement reaction by reacting a nucleophile with an organic reactant having the following general formula:

$$R(X)_a \qquad (I)$$

where:

R is a mono- or polyvalent organic group containing 1 to 720 carbon atoms that is selected from the group consisting of aliphatic radicals, aromatic radicals and combinations of such radicals, can contain or be substituted with moieties that are unreactive with the nucleophile or the organic product and do not adversely affect the desired product;

X is a leaving group selected from the group consisting of Cl, Br, NO$_2$, NO$_3$, and OSO$_2$R', where R' is an organic group selected from the group consisting of alkyl groups, aryl groups, fluoro-substituted alkyl groups and combinations thereof; and a is a number of 1 to 60;

said process comprising the steps of:
(a) reacting said organic reactant with a nucleophile in a liquid organic phase in which no water is added thereto, said nucleophile being derived by:
  (1) metathesis of a water-miscible, thermally stable, cationic phase transfer catalyst selected from the group consisting of quaternary ammonium salts and pyridinium salts with an amount of nucleophilic precursor, said phase transfer catalyst having less than 16 carbon atoms per nitrogen atom, and a cationic portion with at least 10 carbon atoms per nitrogen atom, and said amount of nucleophilic precursor being in excess of the stoichiometric amount required to displace the leaving groups of the organic reactant;
  (2) followed by activation of the product of step (a)(1) by separating water from the product;
(b) extracting the organic product from the product of step (a) with extracting agent comprising water, thereby forming;
  (1) an aqueous phase comprising the phase transfer catalyst and a by-product salt, and
  (2) an organic phase comprising the organic product;
(c) separating phases (b)(1) and (b)(2) to recover the organic phase comprising the organic product;
(d) treating the separated aqueous phase resulting from step (c) with a partially water-miscible alcohol having 4 to 6 carbon atoms and salting agent, the phase transfer catalyst being more soluble in said alcohol and salting agent than it is in an aqueous solution of the salting agent, thereby forming:
  (1) an alcohol phase comprising the phase transfer catalyst and water, and
  (2) an aqueous phase comprising the by-product salt and salting agent;
(e) separating phases (d)(1) and (d)(2);
(f) mixing the separated alcohol phase from step (e) with a replenishing amount of said nucleophilic precursor in order to metathesize the phase transfer catalyst with said nucleophilic precursor;
(g) separating the water and alcohol from the mixture of step (f) thereby forming said nucleophile;
(h) recycling the so-formed nucleophile of step (g) to step (a), and, if necessary in order to obtain an effective amount of said nucleophile to promote the conversion of the organic reactant to the organic product, adding nucleophile derived by the process of steps (a)(1) and (a)(2);
  (i) recycling the separated alcohol from step (g) to step (d); and
  (j) repeating steps (a) through (i) to make a desired amount of the organic product.

2. The process according to claim 1 further comprising recovering the organic product from the organic phase recovered in step (c) by evaporation of any diluent from the organic phase, or cooling the organic phase to form a concentrate product phase, or by crystallization of the organic product from the organic phase.

3. The process according to claim 1, wherein the organic phase recovered in step (c) is admixed with a non-reactive, organic diluent.

4. The process according to claim 1, wherein the partially water miscible alcohol is isobutyl alcohol.

5. The process of claim 1, wherein said phase transfer catalyst is selected from the following formulas:

    (V)

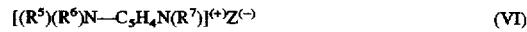    (VI)

wherein $R^1$, $R^2$, $R^3$, $R^4$, $R^5$, $R^6$, and $R^7$, which can be the same or different, are independently selected from $C_1$ to $C_{10}$ organic groups selected from aliphatic linear, branched, or cyclic groups, aromatic groups, or combinations thereof and which organic groups can contain one or more heteroatoms bonded only to carbon atoms providing that there is a linkage with at least three carbon atoms between the depicted quaternary or pyridinium nitrogen atom and any adjacent heteroatom, and where any two of the $R^1$, $R^2$, $R^3$, and $R^4$ groups in formula (V) or the $R^5$ and $R^6$ groups in formula (VI) can, with the N atom to which they are bonded, form a heterocyclic ring containing 3 to 7 atoms; and Z is an anion selected from halide, azide, thiocyanate, sulfate, hydrogen sulfate, alkylsulfate, and aryloxy.

6. The process of claim 1, wherein said phase-transfer catalyst is methyltributylammonium chloride.

* * * * *